United States Patent
Aoki et al.

(10) Patent No.: US 12,044,558 B2
(45) Date of Patent: Jul. 23, 2024

(54) SCALE AND METHOD OF MANUFACTURING THE SAME

(71) Applicant: MITUTOYO CORPORATION, Kawasaki (JP)

(72) Inventors: Toshihiko Aoki, Kanagawa (JP); Kosaku Miyake, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 480 days.

(21) Appl. No.: 17/218,664

(22) Filed: Mar. 31, 2021

(65) Prior Publication Data
US 2021/0381859 A1    Dec. 9, 2021

(30) Foreign Application Priority Data

Jun. 5, 2020  (JP) ................... 2020-098522

(51) Int. Cl.
| | | |
|---|---|---|
| *G01D 5/38* | (2006.01) | |
| *G01D 5/347* | (2006.01) | |
| *G02B 5/18* | (2006.01) | |
| *G02B 27/42* | (2006.01) | |

(52) U.S. Cl.
CPC ........... *G01D 5/38* (2013.01); *G01D 5/34707* (2013.01); *G01D 5/34746* (2013.01); *G02B 5/18* (2013.01); *G02B 5/1857* (2013.01); *G02B 5/1861* (2013.01); *G02B 27/42* (2013.01)

(58) Field of Classification Search
CPC .. G01D 5/38; G01D 5/34707; G01D 5/34746; G02B 5/18; G02B 5/1857; G02B 5/1861; G02B 27/42; G02B 27/32; G01B 11/00; G01B 1/12; G01B 1/18
USPC ......................................................... 359/566
See application file for complete search history.

(56) References Cited

U.S. PATENT DOCUMENTS

| | | | | |
|---|---|---|---|---|
| 4,353,622 A | * | 10/1982 | Gale ................... | G02B 5/1857 430/323 |
| 2005/0207013 A1 | * | 9/2005 | Kanno ................ | G02B 5/1857 250/216 |
| 2006/0140538 A1 | * | 6/2006 | Isano .................. | G01D 5/38 385/37 |
| 2009/0267803 A1 | * | 10/2009 | Tominaga .......... | G01D 5/34707 250/237 G |
| 2013/0112860 A1 | * | 5/2013 | Mizuno .............. | G01D 5/34707 359/439 |

FOREIGN PATENT DOCUMENTS

| | | |
|---|---|---|
| JP | 2009-002670 A | 1/2009 |
| WO | WO-2019187512 A1 * | 10/2019 |

* cited by examiner

*Primary Examiner* — Stephone B Allen
*Assistant Examiner* — Jyotsna V Dabbi
(74) *Attorney, Agent, or Firm* — Rankin, Hill & Clark LLP

(57) ABSTRACT

A scale includes a substrate, a metal layer of Ni formed on one principal surface of the substrate, and a scale grating formed on the metal layer. A plurality of gratings of Cr are disposed at a predetermined interval in the scale grating.

5 Claims, 4 Drawing Sheets

SCALE AND METHOD OF MANUFACTURING THE SAME

TECHNICAL FIELD

The present invention relates to a scale and a method of manufacturing the same.

BACKGROUND ART

A photoelectric linear scale includes, for example, a scale grating that reflects a light irradiated to the scale. As the scale grating, phase grating utilizing a step difference between an upper surface and a lower surface of the grating can be used. For example, a reflective phase grating that includes a grating of metal silicide, such as titanium silicide ($TiSi_x$), on a reflective film of Cr is disclosed (for example, see Patent Document 1).

CITATION LIST

Patent Literature

Patent Document 1: JP 2009-002670 A

SUMMARY OF INVENTION

Technical Problem

However, since the titanium silicide is relatively soft, scratching the grating with, for example, a foreign material on a surface of the scale grating possibly damages the scale grating. For example, since a machine tool generates, for example, metal cutting powder, the use of the scale in an environment where the machine tool is installed may damage the scale grating, possibly resulting in decrease in reliability of the scale.

In one aspect, an object of the invention to provide a scale and a method of manufacturing the same that allow improving reliability.

Solution to Problem

In one aspect, a scale according to the invention includes a substrate, a metal layer, and a scale grating. The metal layer of Ni is formed on one principal surface of the substrate. The scale grating is formed on the metal layer. A plurality of gratings of Cr are disposed at a predetermined interval in the scale grating.

The scale may further include a layer provided between the substrate and the metal layer. The layer is made of a metal having an adhesiveness to the substrate higher than an adhesiveness to the metal layer.

In the scale, the metal having the adhesiveness to the substrate higher than the adhesiveness to the metal layer may be Cr.

The scale may include a fluorinated coating film that covers the scale grating. At least a part of the fluorinated coating film may be a unimolecular fluorinated compound.

A method of manufacturing a scale according to the invention includes: forming films of a metal layer of Ni and a scale grating layer of Cr in this order on a substrate; and performing etching on the scale grating layer to form a scale grating in which a plurality of gratings of Cr are disposed at a predetermined interval.

In the method of manufacturing the scale, the metal layer may be used as an etching stop layer during the etching.

In the method of manufacturing the scale, a wet etching using ceric ammonium nitrate or a dry etching using a chlorine based gas may be performed during the etching.

Advantageous Effects of Invention

A scale and a method of manufacturing the same that allow improving reliability can be provided.

DESCRIPTION OF EMBODIMENTS

Hereinafter, embodiments will be described with reference to the drawings.

First Embodiment

Figure 1A:
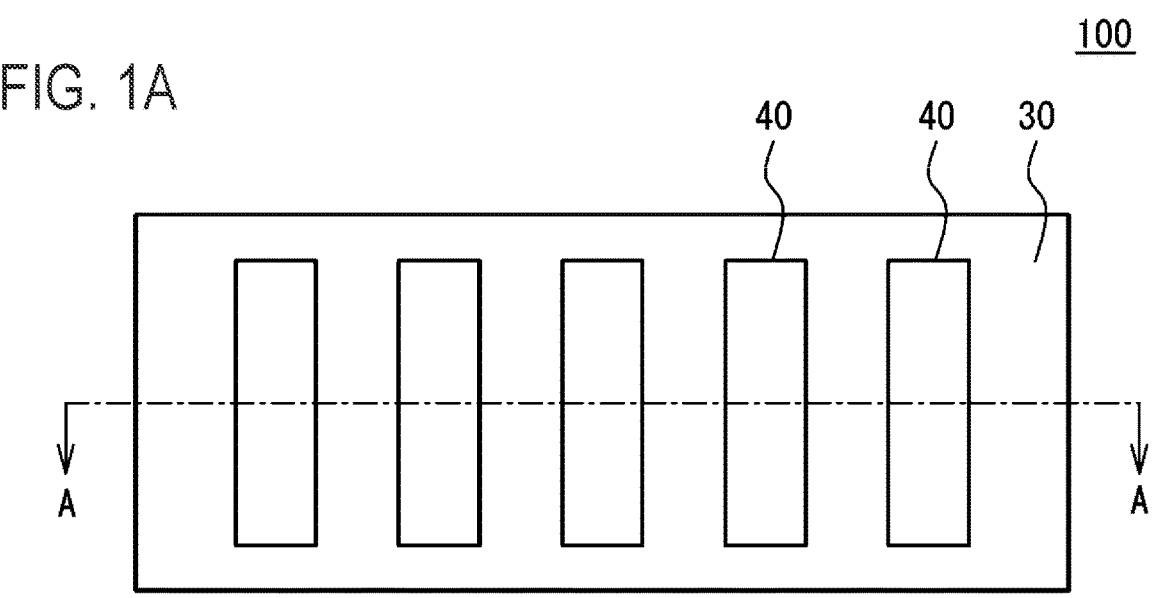
FIG. 1A is a plan view of a scale according to a first embodiment.
Figure 1B:
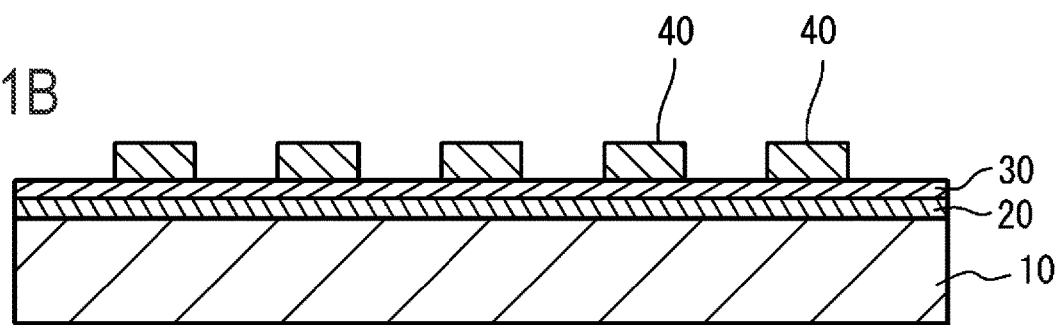
FIG. 1B is a cross-sectional view taken along the line A-A of FIG. 1A.

FIG. 1A is a plan view of a scale 100 according to the first embodiment. FIG. 1B is a cross-sectional view taken along the line A-A of FIG. 1A. As illustrated in FIG. 1A and FIG. 1B as an example, the scale 100 has a structure in which an adhesion layer 20 is formed on a substrate 10, a metal layer 30 that functions as a high reflection layer is formed on the adhesion layer 20, and a scale grating 40 in which a plurality of metallic gratings are disposed at predetermined intervals is formed on the metal layer 30.

The substrate 10 is not particularly limited. The substrate 10 is made of, for example, a material other than a metal. Examples of the material include metal oxide, an organic material, and a glass. A low expansion coefficient material, such as quartz glass (synthetic fused quartz), is used as the glass in some cases.

The adhesion layer 20 is made of a metal having adhesiveness to the substrate 10 higher than adhesiveness to the metal layer 30. Here, the "metal having high adhesiveness" among a plurality of metals refers to a metal having relatively high adhesiveness to the substrate 10, assuming that the metal is formed on the substrate 10 by a same film forming method. However, even when films of specific metals are formed by a plurality of different film forming methods, a range of obtained adhesiveness is small. Therefore, even when films of a plurality of metals are each formed by a different film forming method, a ranking of the obtained adhesiveness does not vary. The adhesion layer 20 is, for example, any of chromium (Cr), titanium (Ti), tantalum (Ta), and titanium silicide ($TiSi_x$). By the use of Cr for the adhesion layer 20, the material is same as that of the scale grating 40 described ater, thereby ensuring reducing kinds of the metal materials used.

The metal layer 30 is made of a metal having reflectivity to light higher than that of the adhesion layer 20. In the present embodiment, Ni is used for the metal layer 30.

The scale grating 40 is constituted by a metal different from that of the metal layer 30. In the present embodiment, Cr is used for the scale grating 40.

According to the present embodiment, phase grating is constituted by the metal layer 30 and the scale grating 40. This allows the scale 100 to be used as an optical reflective scale.

Next, Cr that forms the scale grating 40 and Ni that forms the metal layer 30 have hardness higher than that of the titanium silicide. As a result, even when the scale grating 40 is not covered with, for example, a cover, damage to the surface of the scale grating 40 and the exposed surface of the metal layer 30 can be suppressed. Therefore, high reliability can be obtained. Note that the hardness here means that damage is less likely to occur in, for example, a steel wool abrasion test.

Next, Ni that forms the metal layer 30 and Cr that forms the scale grating 40 have high corrosion resistance, so satisfactory resistance to chemicals can be obtained. Corrosion can be suppressed even in, for example, corrosive environments. Note that the use of, for example, Al and Ag as the metal layer 30 and the scale grating 40 is possible, but Al and Ag cannot obtain high corrosion resistance like Ni and Cr, possibly decreasing durability in reflectivity.

Since Ni is used for the metal layer 30 and Cr is used for the scale grating 40, reflectance higher than that of a structure of titanium silicide/Cr/glass by approximately 10% is obtained, and thus sufficient diffraction efficiency (ratio of diffraction light to incident light) is obtained.

Figure 2:
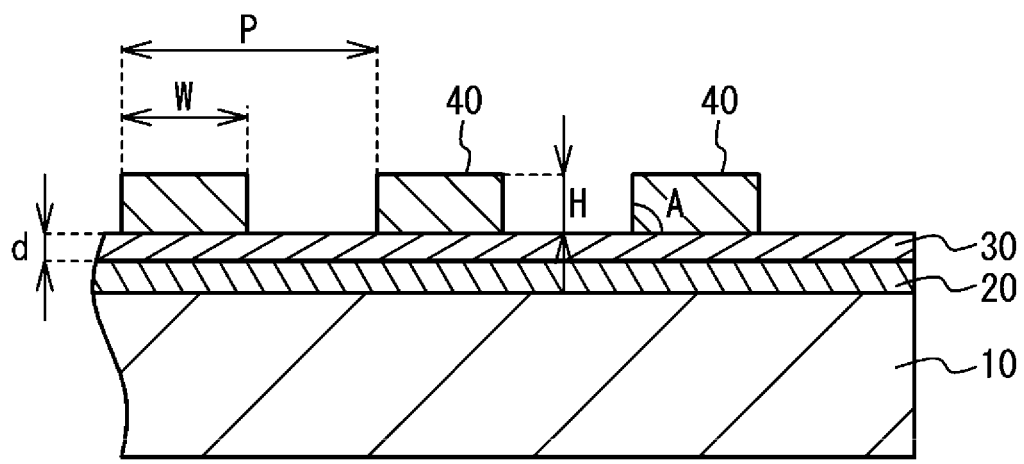
FIG. 2 is a diagram illustrating an example of various dimensions of the scale.

FIG. 2 is a diagram illustrating an example of various dimensions of the scale 100. As illustrated in FIG. 2 as an example, a pitch P of the scale grating 40 is, for example, approximately 2 µm. A width W in a direction in which the respective gratings of the scale grating 40 are arrayed is, for example, approximately from 0.85 µm to 1.05 µm. A height H of each grating of the scale grating 40 is, for example, approximately from 198 nm to 218 nm. A side wall angle A of each grating of the scale grating 40 is, for example, approximately from 75° to 90°. A thickness of the adhesion layer 20 is, for example, approximately from 90 nm to 110 nm. The reflectance of the adhesion layer 20 is, for example, approximately from 58.5% to 64.5%. The reflectance of the metal layer 30 is, for example, approximately from 51% to 57%.

Figure 3A:
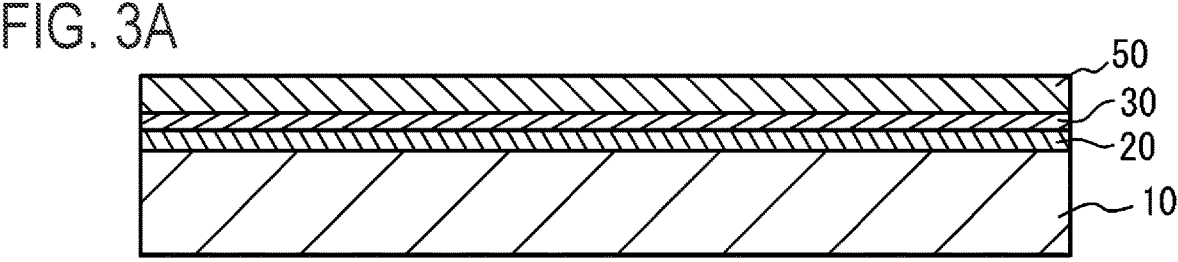
FIG. 3A to FIG. 3D are diagrams illustrating an example of a method of manufacturing the scale.

FIG. 3A to FIG. 3D are diagrams illustrating an example of a method of manufacturing the scale 100. First, as illustrated in FIG. 3A as an example, the adhesion layer 20, the metal layer 30, and an etched layer 50 are formed in this order on one surface of the substrate 10. The adhesion layer 20, the metal layer 30, and the etched layer 50 can be formed by, for example, chemical vapor deposition or physical vapor deposition. The adhesion layer 20, the metal layer 30, and the etched layer 50 can be formed continuously without breaking the vacuum. Because the etched layer 50 is a layer for forming the scale grating 40, the etched layer 50 is made of the material same as that of the scale grating 40.

Figure 3B:
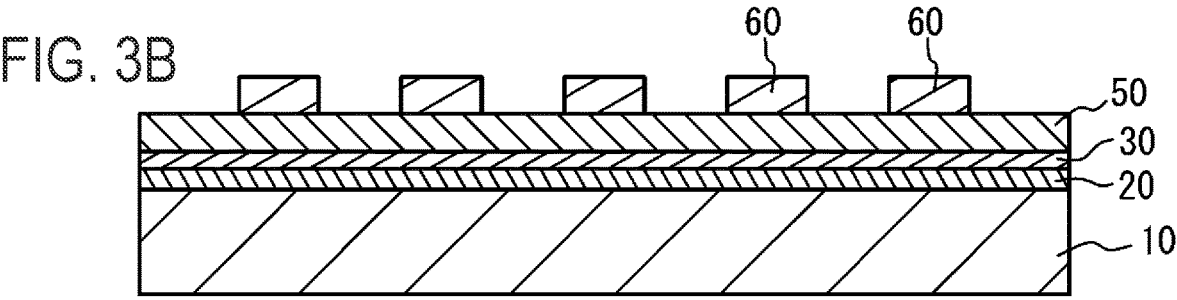
Figure 3C:
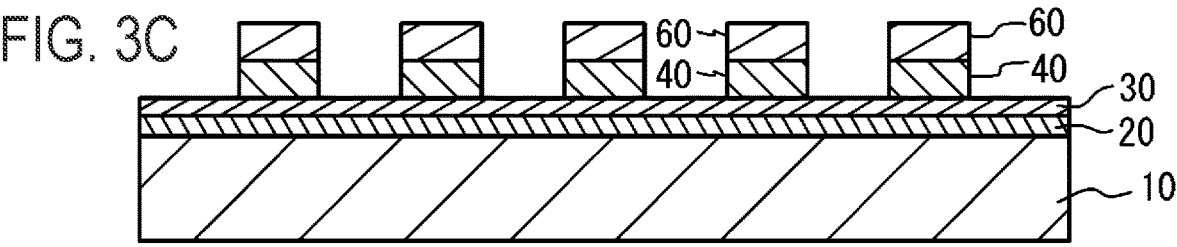
Figure 3D:
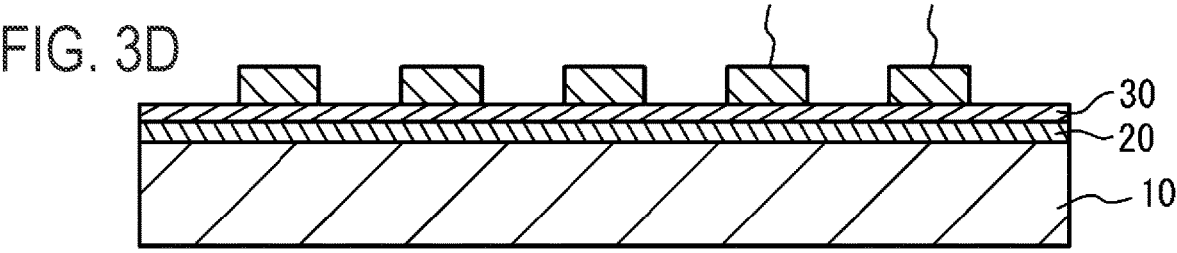

Next, as illustrated in FIG. 3B as an example, resist patterns 60 having the pattern of the scale grating 40 are formed. Next, as illustrated in FIG. 3C as an example, the etched layer 50 is etched using the resist patterns 60 as a mask. Thus, as illustrated in FIG. 3D as an example, the scale grating 40 can be formed. Note that, during etching, the metal layer 30 is used as an etching stop layer.

With the manufacturing method according to the present embodiment, Cr is used for the scale grating 40 on the outermost surface, and Ni is used for the metal layer 30 as the lower layer of the scale grating 40. Accordingly, almost no Ni is etched in wet etching using ceric ammonium nitrate or dry etching using a chlorine based gas. Thus, the height of the Cr grating that determines the optical property of the phase grating is uniquely determined by the Cr film thickness, so the desired optical property is easily obtained.

Second Embodiment

Figure 4:
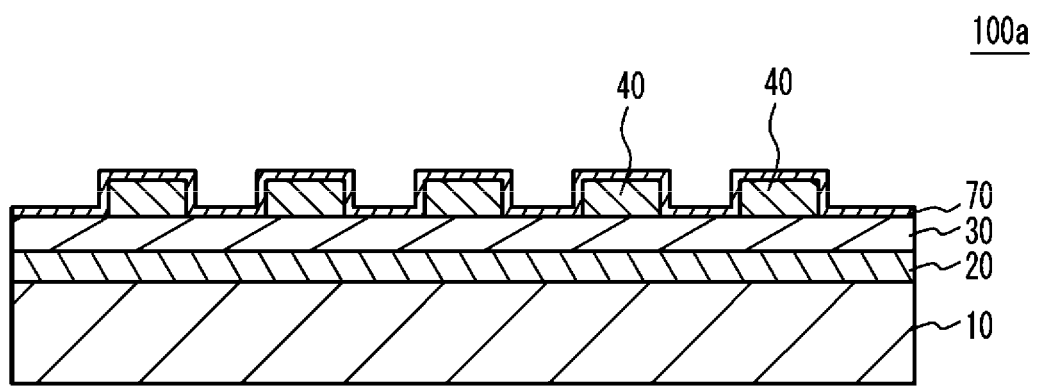
FIG. 4 is a schematic cross-sectional view illustrating an example of a scale according to a second embodiment.

FIG. 4 is a schematic cross-sectional view illustrating an example of a scale 100a according to the second embodiment. As illustrated in FIG. 4 as example, the scale 100a differs from the scale 100 in that a fluorinated coating film 70 is provided so as to cover the exposed part of the metal layer 30 and the scale grating 40.

At least a portion of the fluorinated coating film 70 is a unimolecular fluorinated compound. The fluorinated coating film 70 may cover the exposed part of the metal layer 30 and the entire scale grating 40 with the unimolecular fluorinated compound. The unimolecular fluorinated compound can be formed by spray application or dip coating and then performing removal while the unimolecular layer is left by drying and liquid cleaning. The unimolecular fluorinated compound can be coated with, for example, FluoroSurf, OPTOOL, SFCOAT, SUBERYN, NOVEC1720, or CS1.

Because the fluorinated coating film 70 has water repellency, accumulation of condensation and water droplets can be suppressed. As a result, the corrosion of the scale grating 40 can be suppressed. For example, corrosion can be suppressed even in high-temperature and high-humidity environments, such as a temperature of 120° C. and humidity of 100% for 24 hours. In addition, even when dirt adheres to the fluorinated coating film 70, it can be easily wiped off. For example, wiping using a solvent, such as alcohols or ketones, is possible. Furthermore, the use of the unimolecular fluorinated compound for the fluorinated coating film 70 thins the fluorinated coating film 70. In this case, even when, for example, a scratch occurs in the fluorinated coating film 70, diffuse reflection is suppressed. Additionally, because a friction in the surface of the scale 100a is reduced by the fluorinated coating film 70, a sliding operation of an encoder on which the scale 100a is mounted is smoothed, and a flaw caused by friction and/or dust are suppressed. In addition, strength against a force in a lateral direction to the scale grating 40 is improved because of the reduced friction. As a result, the measurement accuracy of the scale 100a is improved. From the above above-described facts, high accuracy can be maintained while corrosion is suppressed.

EXAMPLES

Hereinafter, a scale according to the first embodiment was produced and properties were examined.

Examples

Cr was used for the adhesion layer 20. Ni was used for the metal layer 30. Cr was used for the scale grating 40. The exposed part of the metal layer 30 and the scale grating 40 were exposed to the atmosphere without being covered with, for example, a protective film.

Comparative Example

A Cr thin film was formed on a substrate. A scale grating of $TiSi_x$ having the same shape as that of the scale grating 40 of Example was formed on the Cr thin film.

Analysis

An abrasion test using a steel wool was performed on the scale grating of respective Example and Comparative Example, and presence or absence of a scratch was checked in photographs of an optical microscope. While a large number of scratches were observed on the surface in Comparative Example, almost no scratches were observed on the surface in Example. Therefore, in Example, it was confirmed that sufficient durability was obtained in ordinary use.

Although the embodiments and examples according to the invention have been described above, it is to be understood that the invention is not limited to the specific embodiments and examples and that various changes and modifications may be made in the invention within the scope of the invention described in the claims.

REFERENCE SIGNS LIST 10 substrate
20 adhesion layer
30 metal layer
40 scale grating
50 etched layer
60 resist pattern
70 fluorinated coating film
100, 100a scale

The invention claimed is:

1. A scale comprising:
a substrate;
a metal layer of Ni;
a layer provided between the substrate and the metal layer;
a scale grating formed directly on the metal layer, a plurality of gratings of Cr being disposed at a predetermined interval in the scale grating;
wherein the layer is made of a metal having an adhesiveness to the substrate that is higher than an adhesiveness to the metal layer.

2. The scale according to claim 1, wherein
the metal having the adhesiveness to the substrate higher than the adhesiveness to the metal layer is Cr.

3. The scale according to claim 2, comprising
a fluorinated coating film that covers the scale grating, at least a part of the fluorinated coating film being a unimolecular fluorinated compound.

4. The scale according to claim 1, comprising
a fluorinated coating film that covers the scale grating, at least a part of the fluorinated coating film being a unimolecular fluorinated compound.

5. The scale according to claim 1, wherein
the metal having the adhesiveness to the substrate higher than the adhesiveness to the metal layer is selected from the group consisting of:
titanium (Ti), tantalum (Ta), and titanium silicide (Ti, $Si_x$).

* * * * *